US012200171B2

(12) United States Patent
Westphal et al.

(10) Patent No.: US 12,200,171 B2
(45) Date of Patent: Jan. 14, 2025

(54) SYSTEMS AND METHODS FOR PROVIDING CALL CENTER SERVICE WITH VISUAL SEARCH

(71) Applicant: W.W. Grainger, Inc., Lake Forest, IL (US)

(72) Inventors: Geoffry A. Westphal, Evanston, IL (US); Erwin Cruz, Hoffman Estates, IL (US); Ketoki Peterson, Lake Forest, IL (US)

(73) Assignee: W.W. GRAINGER, INC., Lake Forest, IL (US)

( * ) Notice: Subject to any disclaimer, the term of this patent is extended or adjusted under 35 U.S.C. 154(b) by 0 days.

(21) Appl. No.: 17/127,531

(22) Filed: Dec. 18, 2020

(65) Prior Publication Data

US 2021/0195028 A1 Jun. 24, 2021

Related U.S. Application Data

(60) Provisional application No. 62/950,282, filed on Dec. 19, 2019.

(51) Int. Cl.
| *H04N 23/50* | (2023.01) |
| *G06F 3/0482* | (2013.01) |
| *G06F 16/245* | (2019.01) |
| *G06F 16/248* | (2019.01) |
| *H04M 3/51* | (2006.01) |
| *G06F 3/0483* | (2013.01) |
| *H04N 23/60* | (2023.01) |

(52) U.S. Cl.
CPC ........ *H04M 3/5183* (2013.01); *G06F 3/0482* (2013.01); *G06F 16/245* (2019.01); *G06F 16/248* (2019.01); *G06F 3/0483* (2013.01); *H04N 23/60* (2023.01)

(58) Field of Classification Search
CPC .... G06F 16/245; G06F 16/248; G06F 3/0482; H04M 3/5183; H04N 23/60
See application file for complete search history.

(56) References Cited

U.S. PATENT DOCUMENTS

| 2009/0005014 A1* | 1/2009 | Vernick | H04M 3/5231 455/414.1 |
| 2011/0051920 A1* | 3/2011 | Dashe | H04M 3/5125 379/265.09 |
| 2015/0294386 A1* | 10/2015 | Hertschuh | G06Q 30/0623 705/26.43 |
| 2017/0148073 A1* | 5/2017 | Nomula | G06Q 30/0617 |
| 2018/0032557 A1* | 2/2018 | Oliner | G06F 16/43 |

* cited by examiner

*Primary Examiner* — Andrea C Leggett
(74) *Attorney, Agent, or Firm* — Barnes & Thornburg LLP

(57) ABSTRACT

A method and system for conducting a service center call with a visual search. The method and system include hosting an electronic database of item information and user information, providing a user interface for allowing a user to obtain image data and initiate a customer service call including the image data. Upon receipt a visual search is conducted with the image data to determine relevant item information and the service call request is routed to a service agent along with the relevant item information for display and conducting the service call.

15 Claims, 6 Drawing Sheets

SYSTEMS AND METHODS FOR PROVIDING CALL CENTER SERVICE WITH VISUAL SEARCH

CROSS REFERENCE TO RELATED APPLICATION

This application is a non-provisional application claiming priority from U.S. Provisional Application Ser. No. 62/950,282, filed Dec. 19, 2019, entitled "Call-Center Service Levels With Visual Search" and incorporated herein by reference in its entirety.

FIELD OF THE DISCLOSURE

The subject invention generally relates to systems and methods for providing enhanced call center support and more particularly, to systems and methods for providing call center service with visual search.

BACKGROUND

In a traditional call center, a customer service agent is oftentimes tasked with answering a customer's service phone inquiry and upon obtaining all of the relevant material related to the customer's issue, providing an answer to the customer. In many instances, a customer service agent is provided with little or no advance information to assist the customer service agent in understanding the customer and/or the issue at hand, and what little information they are provided with is typically gleaned from the customer's caller identification number or inputted by the customer through a menu system, such as an Interactive Voice Response (IVR) system or Automatic Number Identification (ANI) recognition.

Call routing logic has existed for decades. For example, call routing logic may rout a customer service call to a phone agent that has been idle for the longest period of time. As another example, a call may be routed to a customer service agent based upon a particular required skill. By knowing the context of a call, say through the IVR system or ANI recognition, a call may be routed to a phone agent who has the proper skill set to best work through the caller's reason for calling.

There is a limit, however, to the information that may be gleaned from these phone systems. In the situation when a caller does not have enough information or cannot provide enough information to the call center system before reaching a customer service agent, proper routing of the call may not be possible. Furthermore, it is known that forcing a customer to supply additional information through an interminable menuing system may actually be detrimental to the overall call center experience.

While the background systems and methods identified herein, which are incorporated herein by reference in their entirety, generally work for their intended purpose, the subject invention provides improvements thereto, particularly by providing a customer with the ability to connect to a service employee while providing additional relevant information based upon a visual search tool.

BRIEF DESCRIPTION OF THE DRAWINGS

For a better understanding of the present disclosure, reference may be had to various examples shown in the attached drawings.

DETAILED DESCRIPTION

An enhanced customer service system is disclosed hereinbelow. In general, a user having access to a computer or smart device, such as a smart phone, can provide additional visual information to a customer service call and based upon the provided visual information, a routing decision can be made and/or additional information can be displayed to the phone agent using database information associated with the provided call information. In one example, the additional information may be discerned through a user lookup and/or a visual search of the uploaded image, allowing the phone agent's system the ability to retrieve item information.

In one example of the present invention, the methods and systems disclosed provide the use of computer hardware and software, in combination with smart device applications, form factor independent devices (PC, tablets, smart devices and phones, etc.), and cloud based infrastructure to run all functionalities of the call center. In one example, the disclosure provides for a user call center that allows a caller using a mobile, smart device application to take and upload a picture of at least one item relevant to a customer service call. In addition, in still another example, the mobile app includes the capability of capturing sensor or other diagnostic data from a variety of smart device/appliance through Internet of things (IoT) connectivity allowing the caller to upload relevant information into a customer service center system.

As disclosed, once the user captures the relevant information, the caller may then initiate a call, either video or voice call, or a text chat with a phone center for further assistance. While the caller is in the queue for routing to a customer service agent, the system may perform a visual search of the image(s) uploaded by the caller to identify an item, SKU, SKU category, etc. In still other examples, an audio recording, sensor data, or an augmented reality object may be provided to the call center for a visual search.

Based upon caller information and/or any obtained visual search information, a customer service call may be routed to a particular agent or additional information such as product information, product recommendations, etc., may be provided to the agent, and/or may be pushed to the user's app for utilization during and/or after the call. Additional information may include caller buying history, operation and parts manuals (OIPMs), material safety data sheets (MSDSs), warranties, item reviews, vendor and manufacturing videos, item pricing, item recommendations, etc.

Figure 1:
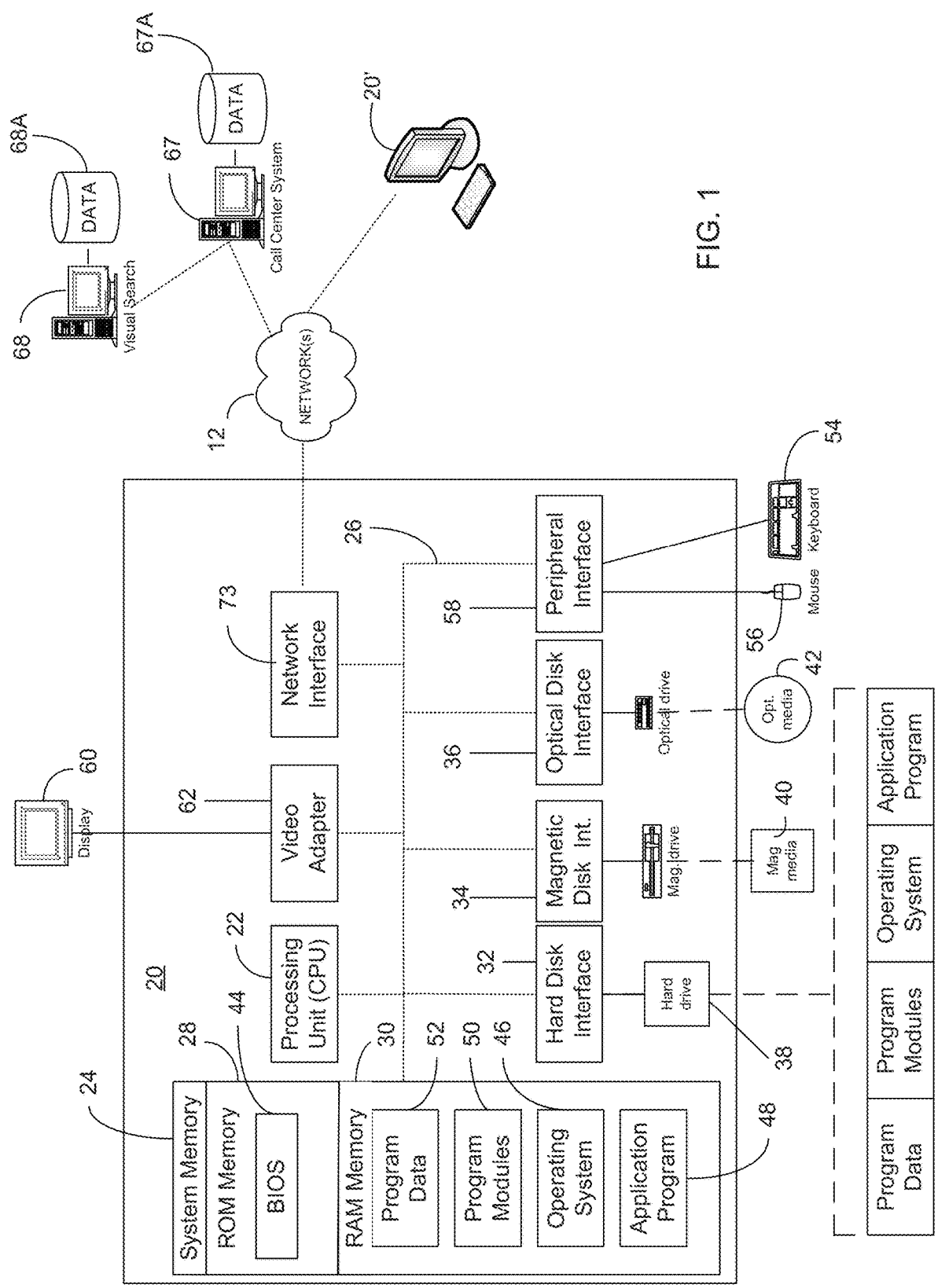
FIG. 1 illustrates in block diagram form components of an example, computer network environment suitable for implementing the example visual search call center system disclosed.

With reference to the figures, the following discloses various example systems and methods for providing an improved call-center service level with visual search. To this end, a processing device 20', illustrated in the exemplary form of a customer service terminal computer system, and a processing device 20, such as a smart phone or smart device, illustrated in schematic form, are provided with executable instructions to, for example, provide a means for a user, e.g., a customer, consumer, etc., to access a visual search server 68, a user information system 67 and, among other things, be connected to a customer service agent operating the processing device 20'. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, and the processing device 20' illustrated in FIG. 1 may be embodied in any device having the ability to execute instructions such as, by way of example, a personal computer, mainframe computer, personal-digital assistant ("PDA"), cellular telephone, tablet, ereader, smart phone, smart device, mobile device, or the like. Furthermore, while described and illustrated in the context of a single processing device 20, and processing device 20' those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit such as a processor 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the bus 26, respectively allow for reading from and writing to a hard drive 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital video-disks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a smart device application (i.e., an App), an Internet browser, etc.), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processor 22 by means of an interface 58 which, in turn, would be coupled to the bus 26. Input devices may be connected to the processor 22 using interfaces such as, for example, a parallel port, game port, firewire, HDMI, or a universal serial bus (USB). To view information from the processing device 20, a display 60 or other type of display device may also be connected to the bus 26 via an interface, such as a video adapter 62. In addition to the display 60, the processing device 20 may also include other peripheral output devices, not shown, such as, for example, speakers, cameras, printers, or other suitable device.

As noted, the processing device 20 may also utilize logical connections via a network 12, to one or more remote processing devices, such as the call center system 67, which may include access to a visual search server 68 having an associated data repository 68A (e.g., an item database including item information). In this regard, while the call center system 67 and the visual search server 68 have been illustrated in the example form of a computer, it will be appreciated that the either of the call center system 67 or the visual search server 68 may, like processing device 20, be any type of device having processing capabilities. Again, it will be appreciated that the call center system 67 and the visual search server 68 need not be implemented as separate devices, but rather may be implemented as a single device or in a manner such that the tasks performed by either of the call center system 67 or the visual search server 68 are distributed amongst a plurality of processing devices/databases located at different geographical locations and linked through a communication network. Additionally, the call center system 67 and/or the visual search server 68 may have logical connections to other local or third party systems (not shown), such as product information systems, via the network 12, such as, for example, the Internet, LAN, MAN, WAN, cellular network, public telephone network, cloud network, enterprise network, virtual private network, wired and/or wireless network, or other suitable network, and via such connections, will be associated with data repositories that are associated with such other third party systems. In the present example, the call center system data repository 67A may include, without limitation, user data including goods and/or services history, personal information, financial information, etc.

For performing tasks as needed, the call center system 67 and/or the visual search server 68 may include many or all of the elements described above relative to the processing device 20. In addition, the call center system 67 and/or the visual search server 68 each would generally include executable instructions for, among other things, receiving a request for a service call center connection, receiving visual search and/or user identification information, performing a visual search and/or a user lookup, routing the connection request and the retrieved visual search and/or user lookup information to the processing device 20' via the network 12, and providing a service call infrastructure for providing the requestor with an informed customer service experience.

Communications between the processing device 20 and the call center system 67 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the call center system 67 and/or the visual search server 68.

Figure 2:
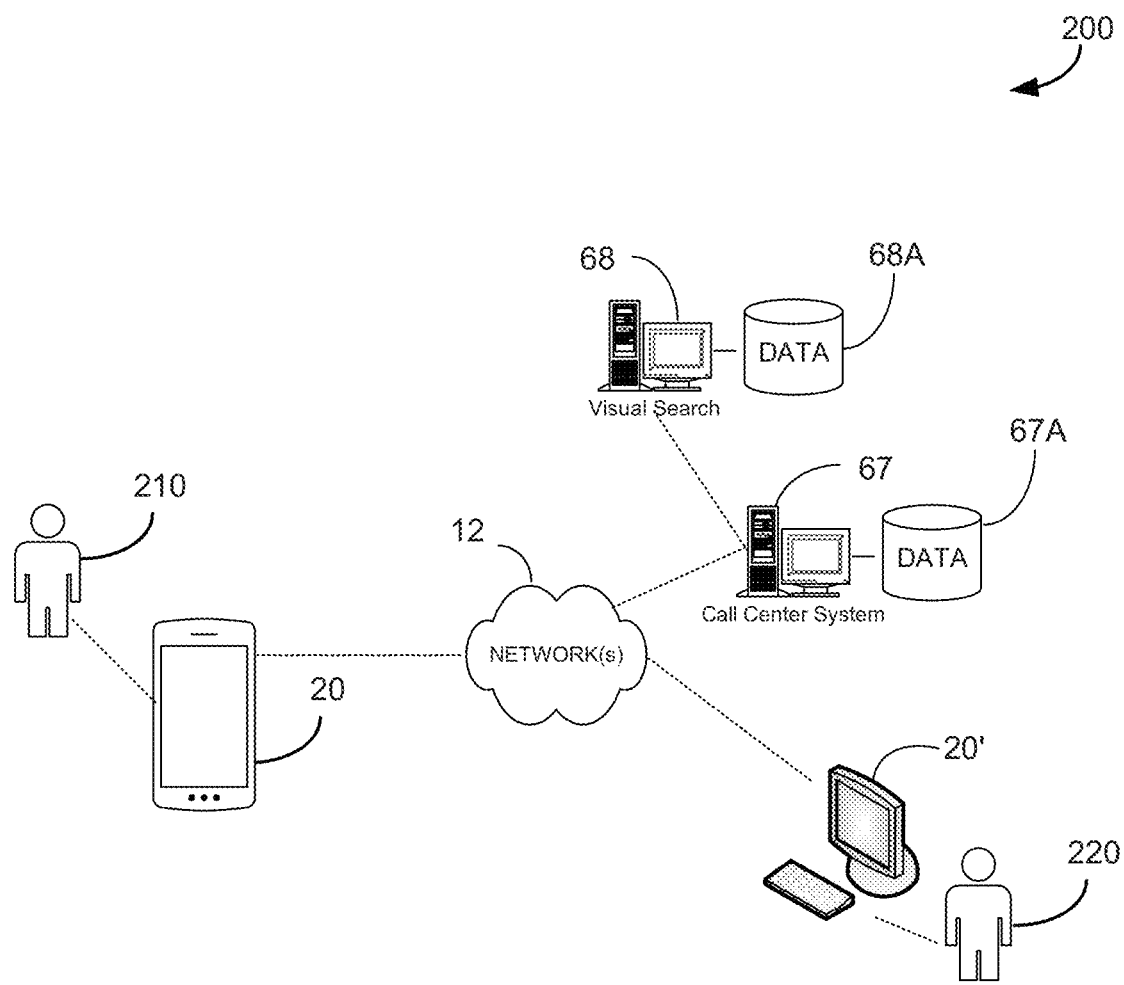
FIG. 2 provides another illustration of the example visual search call center system in accordance with the present disclosure.

Referring to FIG. 2, there is illustrated an overview of an example call center system 200 with visual search capabilities in accordance with an example of the present disclosure. The call center system 200 is well-suited for operation on a distributed network system, such as, for example, the Internet, cloud, mobile network, cellular network, or other suitable wired and/or wireless network. The call center system 200 may be implemented in various other communication networks and/or mediums as desired including, for example, a localized, non-distributed network.

Generally speaking, the call center system 200 is operable to facilitate a call center service call between a user and a call center service agent. For instance, in the illustrated example, a user 210 (e.g., a customer, consumer, shopper, etc.), operating the processing device 20 and having need of user assistance, places a customer service call, such as a video and/or audio phone call, to a customer service server (e.g., the call center system 67) through any suitable network such as the network 12. It will be appreciated that throughout this disclosure, user and customer may be used interchangeably to indicate a general user of the disclosed invention. In this example, the network 12 is coupled to the call center system 67 to distribute the call to one of a plurality of customer service agents 220 associated with the processing device 20'.

In this example, the user 210 remotely initiates a customer service call through any suitable processing device 20, such as a tablet, a smart phone, a computer system, or any other suitable known or yet to be developed communication device. In the disclosed example, the processing device 20 is capable of taking, obtaining, and/or otherwise receiving images, such as pictures, and transmission of the images to the call center system 67.

In the disclosed example, the user 210 may take or otherwise obtain an image of interest on the processing device 20 and initiate a service call, providing the image along with the service call. Once the service call is initiated, the call is routed through the network 12 to the call center system 67. Upon receipt of the call the call center system 67 may perform a user lookup in the data repository 67A (per any suitable user lookup) and concurrently perform a visual search on the provided image. A visual search may be performed via any suitable visual search process, including for instance the processes disclosed in U.S. Pat. Nos. 10,698, 946, and 9,613,283, each of which are incorporated herein by reference in their entirety.

The service call will then be presented to the phone agent 220 who will answer the call. The processing device 20' and thus the service agent 220 will be presented with all additional supporting information available, including user information, previous user call data, user history, etc., as well as the results of the image search, including product information, product identifiers, SKUs, product recommendations, etc.

For example, in one simplified use example, a user may want to order a part for a simple repair but may not appreciate the name of the part or recognize the item. In this instance, the user may take a picture of the item on the app associated with their smart device and initiate a service call. The call center system receives the user request and identifies the user based upon their caller identification. Meanwhile the call center system performs a visual search on the provided image and identifies the item in question. The call and the additional information (if available) are then provided to the customer service agent, who is provided with the user identification, all data associated with the user, including past pricing information, past purchases, shipping information, etc., and the item details. The customer service agent then simply needs to confirm the data and the call may be completed in short order. In still further examples, the user and phone agent interactions (e.g., voice recording of the call, mouse clicks, etc.), may be saved and used as input for deep learning and increase suture service levels by giving callers and phone agents more accurate information before and during the call. As a result, the reliability and/or accuracy of the visual search server 68 may be improved.

Figure 3:
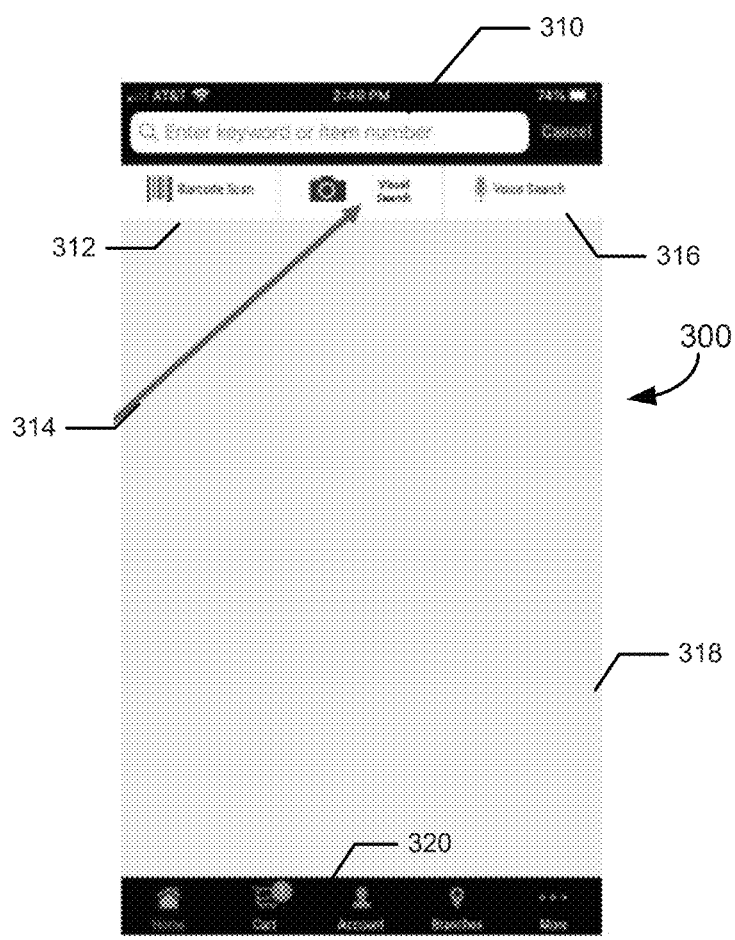
FIG. 3 illustrates an example user interface for implementing the example visual search call center system in accordance with the present disclosure.

Turning now to FIG. 3, there is illustrated an example of a user interface for presentation on the display 60, including user interface elements for conducting a call center service call with visual search capabilities in accordance with the teachings of the present disclosure. For example, FIG. 3 illustrates an example user interface 300 which may be displayed on the processing device 20, such as through a smart device app as is known to one of ordinary skill in the art. In the illustrated example, the user interface 300 utilizes a speaker and microphone of the smart device for audio calls, as well as a camera (e.g., a front and/or rear facing camera) of the smart device for image capturing and/or video calls.

The example user interface includes a keyword or item number search user interface element 310, as well as an image user interface element 312, such as a barcode scan, a visual search user interface element 314, and a voice search user interface element 316. The user interface 300 also comprises the display 60, such as a display area 318 and a user interface bar 320 including a plurality of additional option, such as a "home" button, "cart" button, "account" button, etc. as is known in the art.

Figure 4:
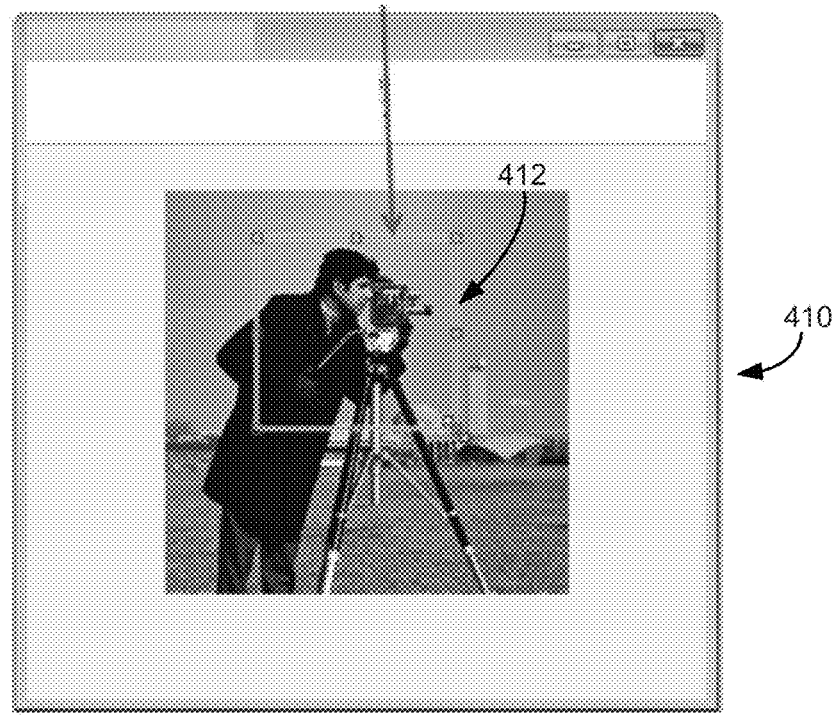
FIG. 4 illustrates an example user interface for editing or further identifying image information for use with the example visual search call center system.

As will be disclosed in greater detail, in operation, a user will click or otherwise activate the visual search user interface element 314 to initialize the camera of the processing device 20 and allow the user to obtain one or more images of one or more products, SKUs, etc., which may be viewed by the user in an image display area 410 as illustrated in FIG. 4. Once the image is obtained, the user may interact with the image on user interface 300 to review and/or edit the image to better identify the item of interest. In the illustration of FIG. 4, the user has added a temporary "lasso", such as the identification box 412 to identify the area of interest in the obtained image.

Figure 5:
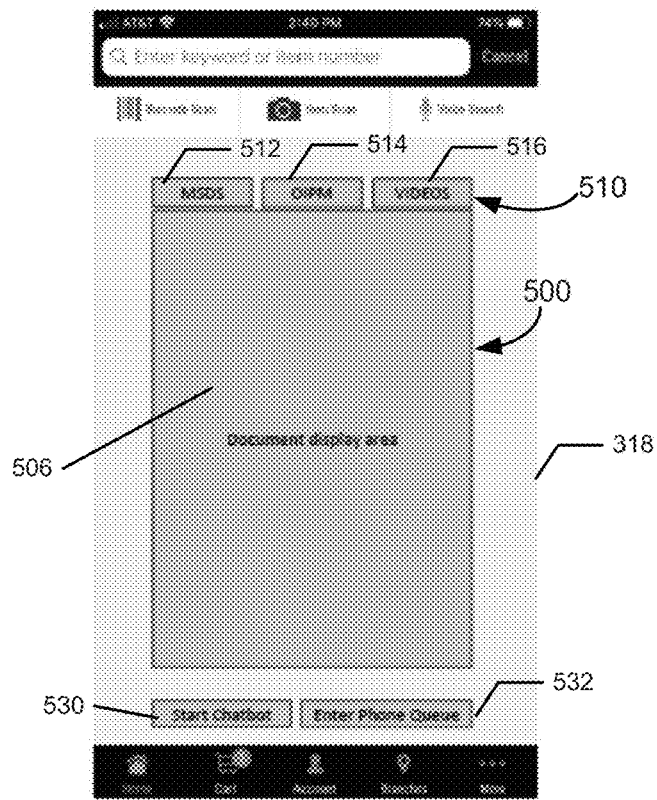
FIG. 5 illustrates an example user interface for displaying additional information to the user of the example visual search call center system.

As is known in the art, once the image is obtained and/or modified, the app may perform a visual search, returning additional information, such as manuals, safety information, videos, product information, etc. As illustrated in FIG. 5 the additional information is displayed in the display area 318 and comprises a user interface element 500 having a main document display area 506. In the illustrated example, the user interface element 500 comprises a plurality of tabs 510, such as an MSDS tab 512, an OIPM tab 514, and a videos tab 516. It will be understood that less, additional, or alternative tabs may be displayed as desired. Consistent with known tab/display practices, selecting any one of the tabs 510 changes the information in the display area 506 to correspond to the chosen tab 510.

As will be understood, in some instances, the provided additional information may be sufficient for the user's needs. In some instances, however, the user may have questions, necessitating a customer service agent. In these instances, a request user interface element such as a chat element 530 or a phone element 532 may be utilized to initiate a customer service call request. As is well known in the art, the example chat element 530 may initiate an online text chat session with a customer service agent. In addition, the example phone element 532 will initiate a customer service call request in accordance with the teachings of the present disclosure.

Figure 6:
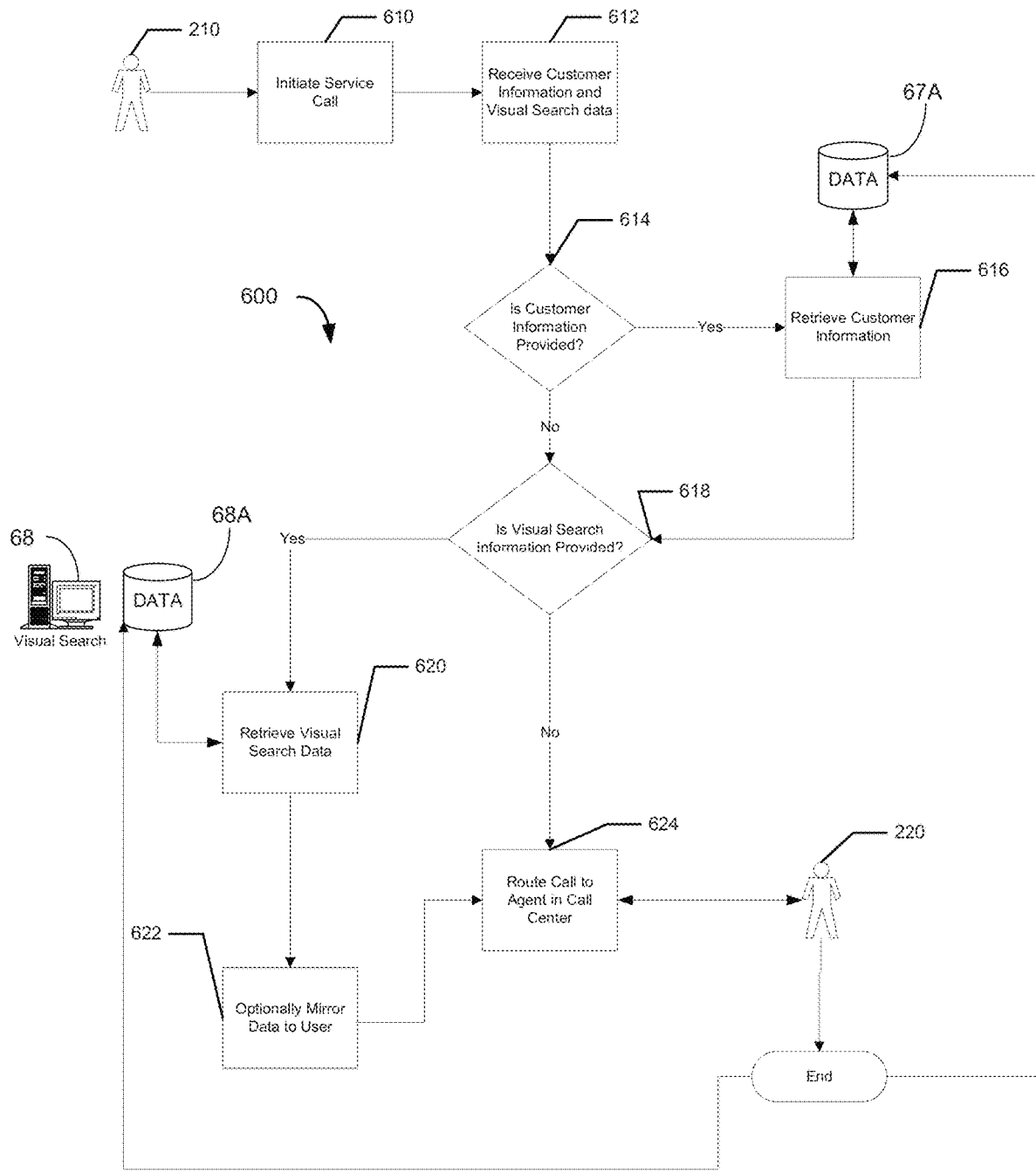
FIG. 6 illustrates a detailed flowchart of an example method and system for processing a service center call request in accordance with the present disclosure.

Referring to FIG. 6, there is illustrated a flowchart of an example customer service process 600 that may be implemented on a computer system and/or provided on a non-transitory computer readable medium to implement the service center call system with visual search disclosed herein. It will be appreciated that the disclosed processes and systems may be implemented in any suitable environment, including, for example, any service location, or other environment where a service call may be placed.

In the example of FIG. 6, the process 600 begins at block 610 when the user 210 initiates a service center call through the user interface phone element 532, or any suitable user interface element. As previously noted, the call may be initiated through obtaining an image and selecting the visual search user interface element 314 or the call may be initiated through another application such as a website and/or suitable communication application. As previously described, the initiation of the service call provides a connection to the call center system 67 through the network 12. At block 612, the call center system 67 receives user information and visual search data from the user 210. It will be understood that the user information may be obtained through any suitable data retrieval means, including an IVR system, ANI identification, etc., as is known in the art. In addition, as noted previously, the visual search information may be optionally forwarded to the call center system 67.

At block 614, the call center system 67 determines whether user information is provided. If the user information is provided, the user information is retrieved from the data repository 67A at block 616 and the process proceeds to block 618 for further processing. At block 618, and if user data is not provided, the system then determines whether visual search information, such as an image as described above, is provided. If the visual search information is provided, at block 620, visual search results, if available, including relevant item information is retrieved from the visual search server 68.

It will be understood that any suitable information may be utilized to perform a visual search in accordance with the present disclosure. For instance, caller information, including history, location, account type, etc., may be provided to the visual search server 68 to provide more relevant result information. In one case, the relevant information may be displayed and/or updated to the caller while the caller is awaiting routing to the caller agent. This information can help the caller make a buying decision or help the caller with the operation or application of the item. In some instance, the caller may not have to connect with the caller agent. Additionally, by knowing additional information regarding the caller, such as location (e.g., rural v. urban; cold climate v. warm climate, etc.) or work industry (e.g., metal ladders are not recommended for electricians, non-sparking tools are used in applications where sparks may ignite a fire, NSF items must be used in food handling applications, etc.) the caller agent may help make more informed recommendations to the user as needed.

Once the visual search data is retrieved, the results may be optionally transmitted to the processing device 20 for mirrored display to the user at block 622. Upon retrieval of the visual search data, or if no visual search data is provided, the call is routed to the agent 220 at block 624. As previously indicated, all of the available relevant information, e.g., the retrieved and/or provided user information and the retrieved and/or provided visual search data is routed displayed to the agent 220 and the service call may proceed as is known to one of ordinary skill in the art. It will be understood that prior too, during, or after the call, the data in the data repository 67A, and the data repository 68A may be edited, updated, or newly added as desired to improve the quality of the data within the data repositories.

Figure 7:
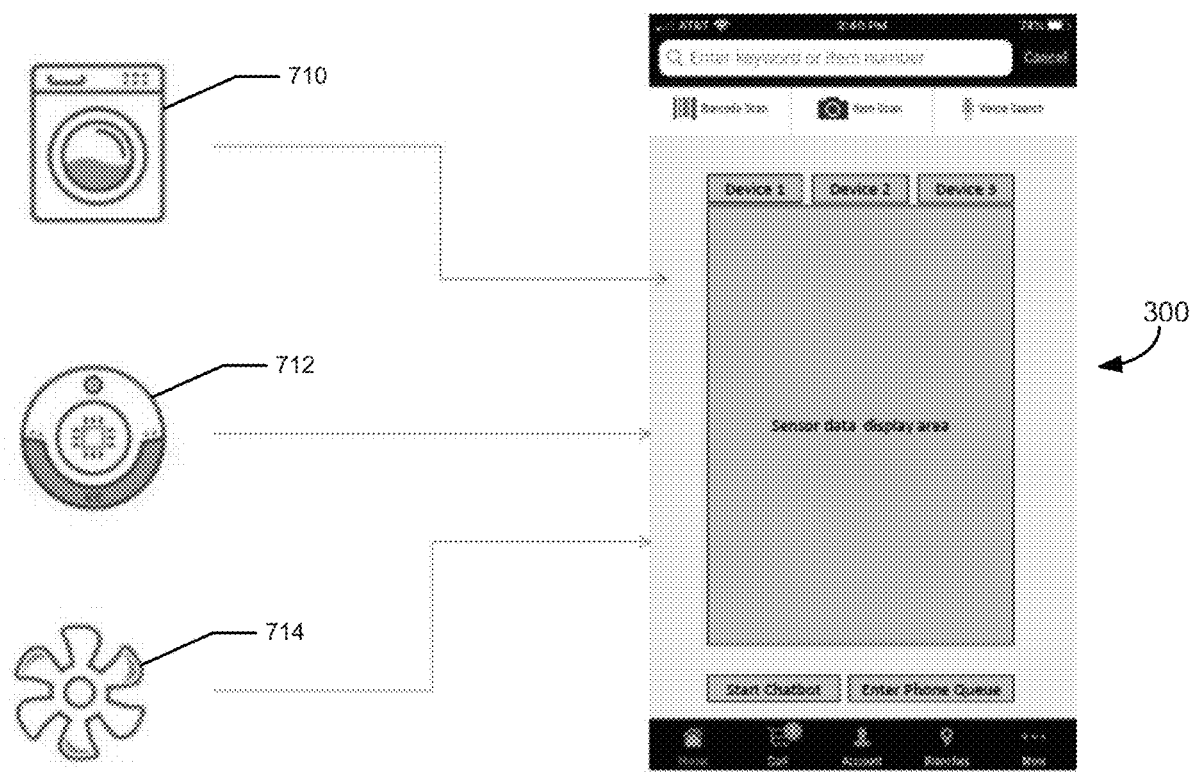
FIG. 7 illustrates another example input for use with the example visual search call center system.

As is illustrated in FIG. 7, an optional and/or additional method of providing data to the user interface 300 is shown. In this example, the processing device 20 may utilize any number of accessory features, including near field communication (NFC), WiFi, Bluetooth, microphones, video and/or image cameras, global positioning system (GPS), or other suitable feature to obtain smart appliance data, such as sensor data, video data, audio data, and/or diagnostic data from any of a plurality of smart devices 710, 712, 714. In this instance, the obtained information from the smart devices 710, 712, 714, may be utilized to supplant or supplement any data provided by the visual search.

Still further, it will be understood that during image procurement, the camera can be used to take one or more pictures of any of the relevant items of interest to the user. In addition, as is known in the art, the visual search server may provide additional feedback to the user, such as camera position and/or angle movement, etc. to improve the number and/or qualities of images provided to the visual search. Furthermore, more than one item may be provided and/or identified during the visual search process, and options may be presented to the user or the customer service representative to narrow the results to the relevant item of interest.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A computer-readable media having stored thereon computer executable instructions, wherein the instructions perform steps for receiving a customer service call and performing a visual search, comprising:

hosting an item database of information regarding item information;

providing an image user interface comprising image user interface elements for allowing a user to upload an image associated with an item;

providing a request user interface comprising request user interface elements for allowing the user to transmit a customer service call request comprising the uploaded image;

receiving the customer service call request including the uploaded image;

using the uploaded image to obtain relevant item information in the item database;
receiving the relevant item information and associating the relevant item information with the customer service call request;
routing the customer service call request to a human service agent; and
displaying the relevant item information to the human service agent.

2. The computer-readable media as defined in claim 1, wherein the image user interface elements and the request user interface elements are displayed on a smart device.

3. The computer-readable media as defined in claim 2, wherein the smart device comprises a camera and the camera is used to obtain the image associated with the item.

4. The computer-readable media as defined in claim 1, wherein the uploaded image comprises at least one of: an image of the item; an image of a product identifier identifying the item; sensor data associated with the item; audio data associated with the item; or video data associated with the item.

5. The computer-readable media as defined in claim 1, further comprising: hosting a user database of information regarding user information; receiving the customer service call request further comprising user identification information; performing a user lookup with the user identification information in the user database to obtain relevant user information; and displaying the relevant user information to the human service agent.

6. The computer-readable media as defined in claim 5, further comprising saving changes to at least one of the relevant item information or the relevant user information made by the human service agent to at least one of the item database or the user database.

7. The computer-readable media as defined in claim 1, wherein the customer service call request includes at least one of video call, text chat, or voice call data.

8. The computer-readable media as defined in claim 1, further comprising: providing a display user interface for allowing a user to display the relevant item information to the user; and transmitting the relevant item information to the display user interface; and displaying the relevant item information on the display user interface.

9. A computer system for distribution of a service center call comprising:
an item database provided with information regarding item information;
an image user interface comprising user interface elements to allow a user to upload an image associated with an item;
a request user interface to allow the user to initiate a customer service call request comprising the uploaded image;
a receiver for receiving the customer service call request including the uploaded image; and
a processor configured to use the uploaded image to obtain relevant item information in the item database,
to route the customer service call request to a human service agent, and
to display the relevant item information to the human service agent on a display.

10. The computer system as defined in claim 9, wherein the image user interface elements and the request user interface elements are displayed on a smart device.

11. The computer system as defined in claim 10, wherein the smart device comprises a camera and the camera is used to obtain the image associated with the item.

12. The computer system as defined in claim 9, wherein the uploaded image comprises at least one of: an image of the item; an image of a product identifier identifying the item; sensor data associated with the item; audio data associated with the item; or video data associated with the item.

13. The computer system as defined in claim 9, further comprising: a user database provided with information regarding user information; the receiver receiving the customer service call request further comprising user identification information; and the processor further configured to access the user database and perform a user lookup with the user identification information to obtain relevant user information, and to display the relevant user information to the human service agent on the display.

14. The computer system as defined in claim 9, wherein the customer service call request includes at least one of video call, text chat, or voice call data.

15. The computer system as defined in claim 9, further comprising: a display user interface for allowing a user to display the relevant item information to the user, and the processor further configured to transmit the relevant item information to the display user interface and to cause the display user interface to display the relevant item information.

* * * * *